US009507667B1

(12) United States Patent
Scott et al.

(10) Patent No.: US 9,507,667 B1
(45) Date of Patent: Nov. 29, 2016

(54) COMPUTER METHODS AND COMPUTER SYSTEMS FOR AUTOMATIC DATA ANALYSIS, RECONCILLIATION AND REPAIR

(71) Applicant: Broadridge Securities Processing Solutions, Inc., Jersey City, NJ (US)

(72) Inventors: Steven Scott, Fort Wayne, IN (US); Barry Weikle, Fort Wayne, IN (US); Stephen Howie, Fort Wayne, IN (US); Nathan Engquist, Fort Wayne, IN (US)

(73) Assignee: Broadridge Securities Processing Solutions, Inc., Jersey City, NJ (US)

( * ) Notice: Subject to any disclaimer, the term of this patent is extended or adjusted under 35 U.S.C. 154(b) by 0 days.

(21) Appl. No.: 14/044,511

(22) Filed: Oct. 2, 2013

Related U.S. Application Data

(63) Continuation of application No. 13/861,258, filed on Apr. 11, 2013, now abandoned.

(60) Provisional application No. 61/622,976, filed on Apr. 11, 2012.

(51) Int. Cl.
*G06F 17/30* (2006.01)
*G06F 11/14* (2006.01)
*G06F 15/16* (2006.01)

(52) U.S. Cl.
CPC ................. *G06F 11/1435* (2013.01)

(58) Field of Classification Search
CPC ................... G06F 17/30371; G06F 17/30067
USPC ................................................. 707/687, 927
See application file for complete search history.

(56) References Cited

U.S. PATENT DOCUMENTS

| 2002/0156776 A1* | 10/2002 | Davallou | 707/3 |
| 2006/0015429 A1* | 1/2006 | Sullivan et al. | 705/35 |
| 2006/0184539 A1* | 8/2006 | Blake et al. | 707/10 |
| 2009/0048883 A1* | 2/2009 | Kelly et al. | 705/7 |
| 2011/0106672 A1* | 5/2011 | Stinson | 705/30 |
| 2011/0218980 A1* | 9/2011 | Assadi | 707/700 |

* cited by examiner

*Primary Examiner* — Alex Gofman
(74) *Attorney, Agent, or Firm* — Greenberg Traurig, LLP

(57) ABSTRACT

In some embodiments, the instant invention includes a computer-implemented method that includes: specifically programming at least one computer system to perform: automatically obtaining input financial data; automatically determining units of work that the input financial data can be organized into; automatically importing the input financial data into a database based on the units of work; automatically validating the imported input financial data, by: identifying deficient units of work based on predefined rules, where each deficient unit of work has a current data error; analyzing, based on research information, the current data error to determine a current corrective action to remedy the current data error; and verifying that the current corrective action does not result in: an additional deficient unit of work, an additional data error, and a change in at least one predefined data report; and automatically executing the current corrective action to remedy the current data error.

10 Claims, 13 Drawing Sheets

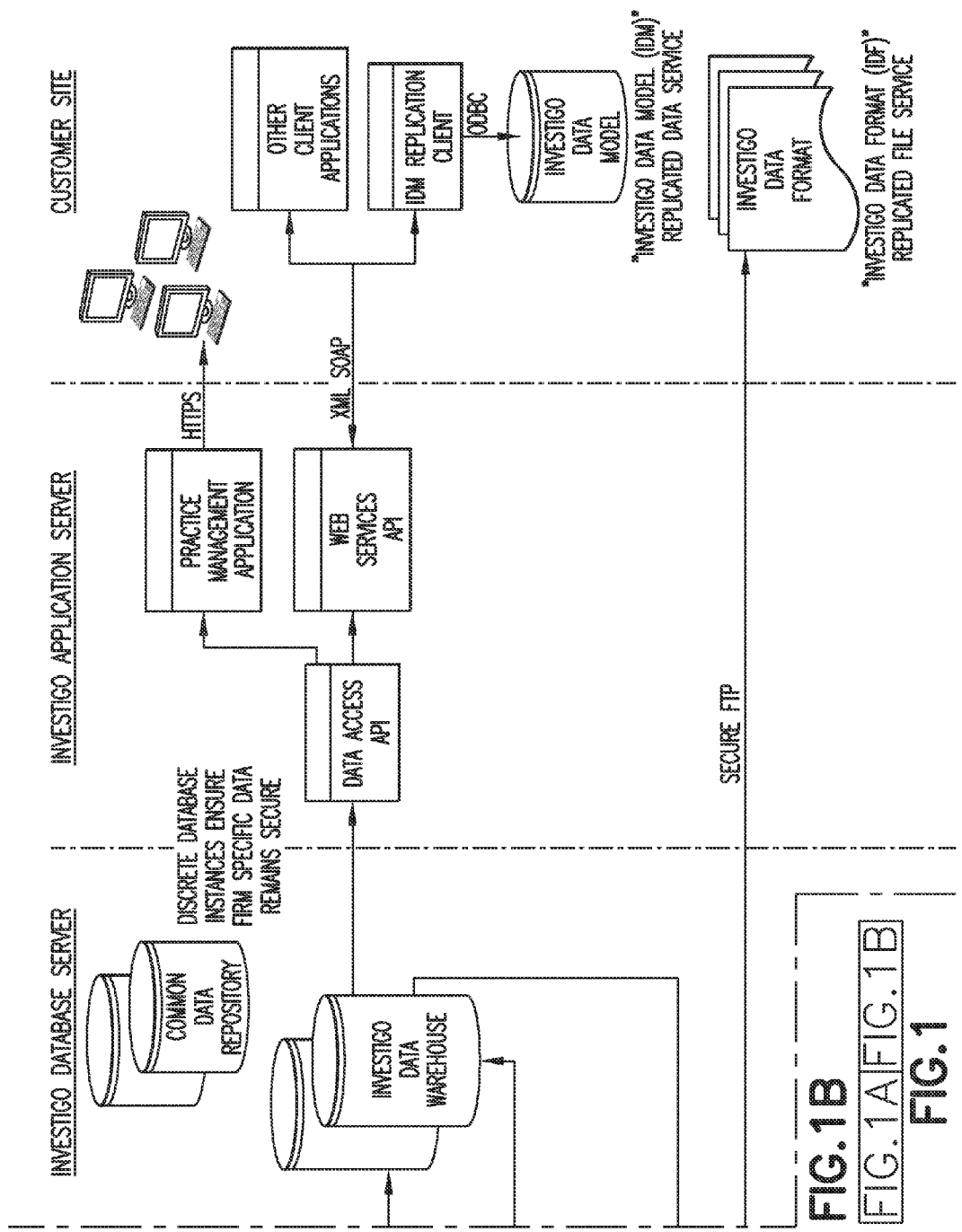

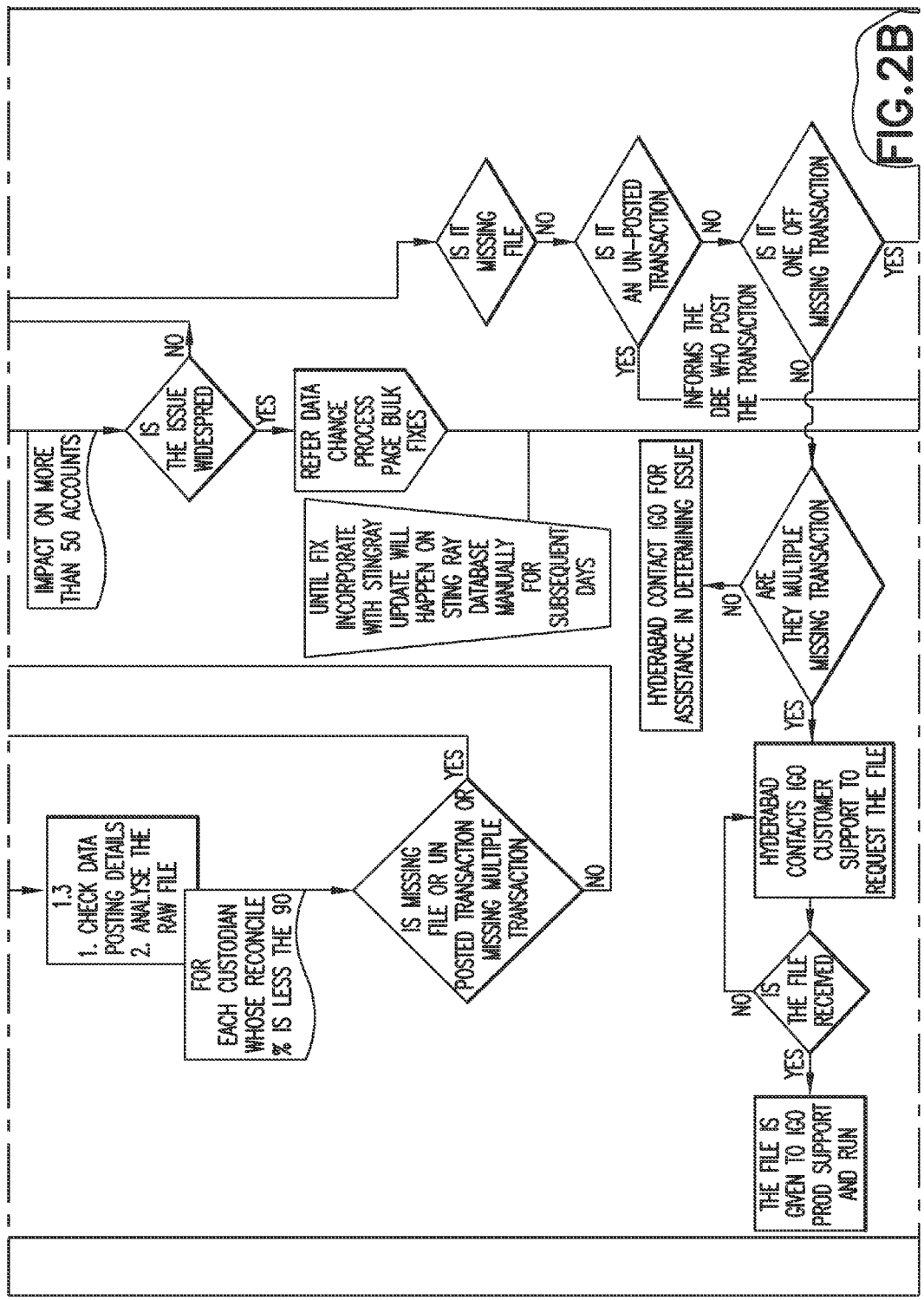

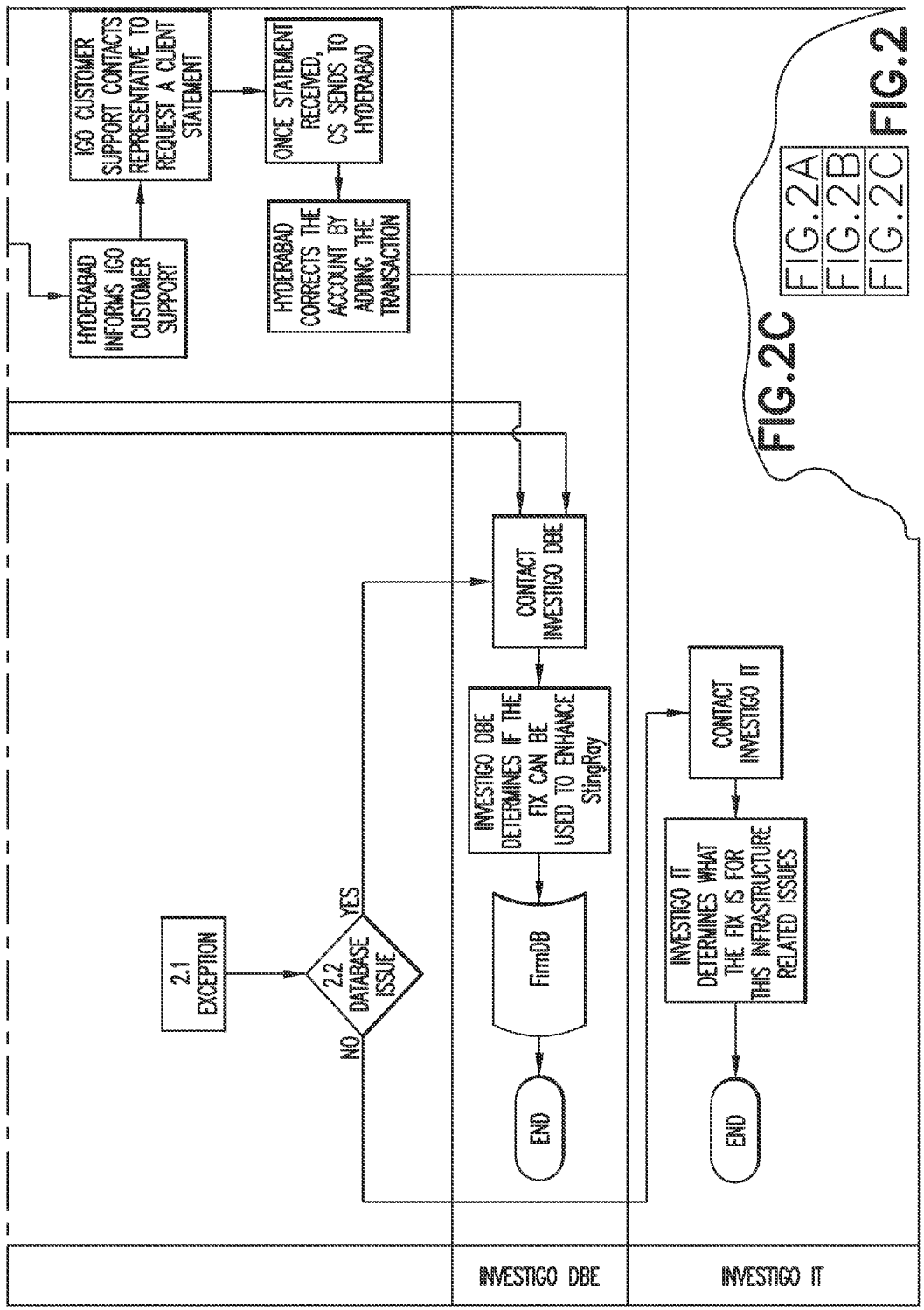

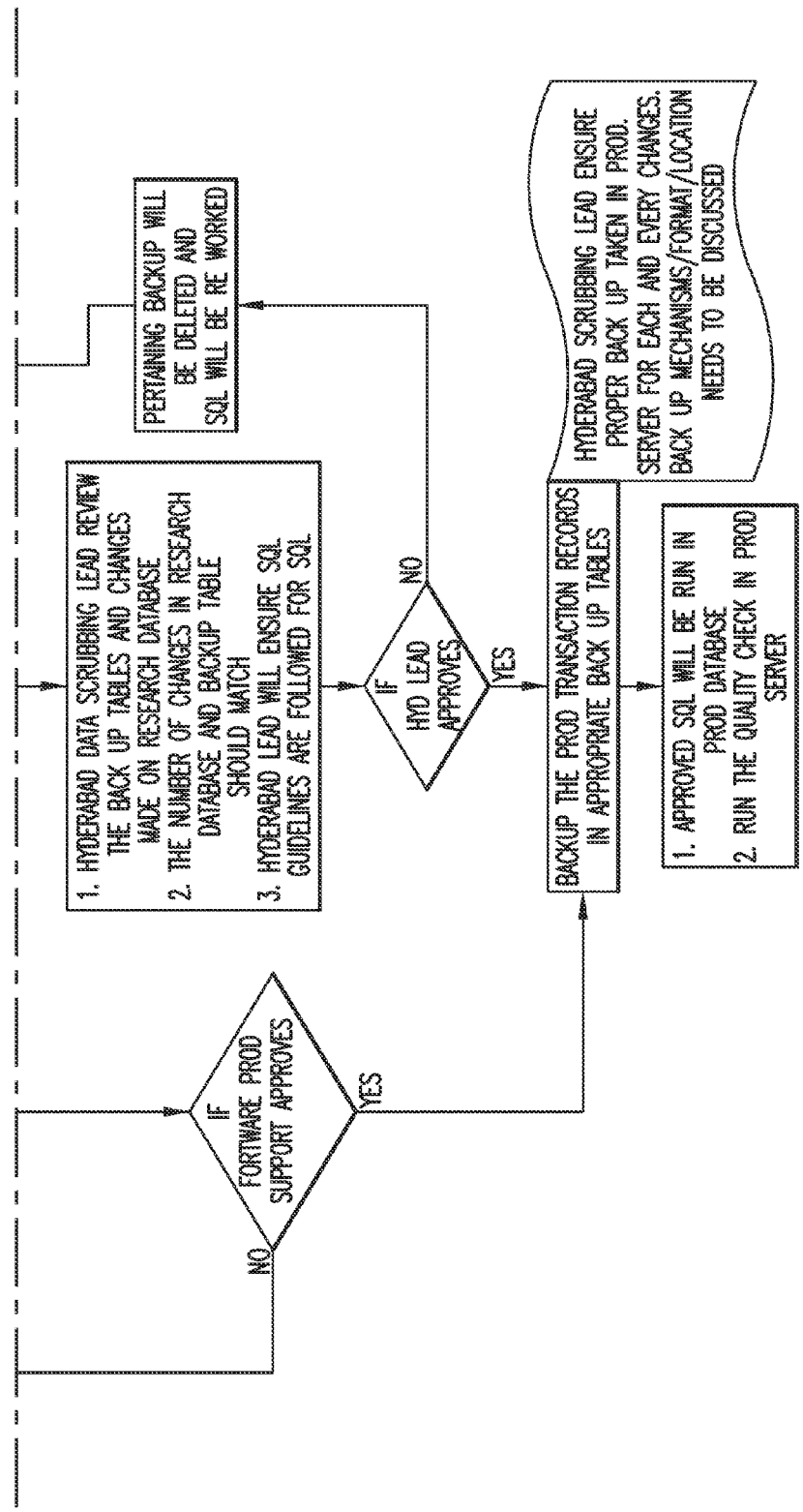

COMPUTER METHODS AND COMPUTER SYSTEMS FOR AUTOMATIC DATA ANALYSIS, RECONCILLIATION AND REPAIR

RELATED APPLICATIONS

This application claims the priority of U.S. provisional application U.S. Patent Appln. No. 61/622,976; filed Apr. 11, 2012; entitled "COMPUTER METHODS AND COMPUTER SYSTEMS FOR AUTOMATIC DATA ANALYSIS, RECONCILIATION AND REPAIR," which is hereby incorporated herein by reference in its entirety for all purposes.

TECHNICAL FIELD

In some embodiments, the instant invention is related to data analysis and repair as part of data processing.

BACKGROUND

Typically, records of financial data (e.g., account data, transactional data) need to be verified or be reconciled against other financial data to confirm the correctness of the original financial data.

SUMMARY OF INVENTION

In some embodiments, the instant invention includes a computer-implemented method that includes at least: specifically programming at least one computer system to perform at least the following: automatically obtaining input financial data from at least one source; automatically determining a first plurality of units of work that the input financial data can be organized into; automatically importing the input financial data into at least one database based, at least in part, on the first plurality of units of work; automatically validating the imported input financial data, where the validating includes at least: identifying, in the imported input financial data, a second plurality of deficient units of work based on a third plurality of predefined rules, where each deficient unit of work is a unit of work having at least one first current data error, analyzing, based at least in part on research information in at least one first research database, the at least one first current data error to determine at least one first current corrective action to remedy the at least one first current data error, where the research information comprises historical information about at least one first previous data error and at least one first previous corrective action that remedied the at least one first previous data error, and verifying that the at least one first current corrective action does not result in at least one of: i) at least one additional deficient unit of work, ii) at least one additional data error, and iii) at least one change in at least one predefined data report; and automatically executing the at least one first current corrective action to remedy the at least one first current data error.

In some embodiments, each unit of work from the first plurality of units of work represents an account or a financial asset.

In some embodiments, the step of the automatically validating the imported input financial data can include segregating each deficient unit of work from the second plurality of deficient units of work into predefined categories.

In some embodiments, the third plurality of predefined rules can include: i) at least one first standard rule that is a required rule, and/or ii) at least one optional rule.

In some embodiments, the third plurality of predefined rules includes rules associated with at least one of: i) position validation, ii) cash balance validation, iii) data element validation, iv) security validation, and v) posting considerations validation.

In some embodiments, the at least one first current data error is personal to a particular unit of work.

In some embodiments, the at least one first current data error is associated with the common among the second plurality of deficient units of work.

In some embodiments, the step of the automatically validating the imported input financial data can further include: withholding from posting each deficient unit of work for which a corrective action has not been determined.

In some embodiments, the step of the automatically validating the imported input financial data can further include: automatically marking each deficient unit of work when posting the imported input financial data so as to visually identify each deficient unit of work.

In some embodiments, the step of the automatically marking can further include: visually identifying each deficient unit of work based at least in part on one of: i) at least one first type of data error, and ii) at least one first pattern of data errors.

In some embodiments, the instant invention includes a computer system that includes at least the following components: a non-transient memory having at least one region for storing computer executable program code; and at least one processor for executing the program code stored in the memory, where the program code includes at least: code to automatically obtain input financial data from at least one source; code to automatically determine a first plurality of units of work that the input financial data can be organized into; code to automatically import the input financial data into at least one database based, at least in part, on the first plurality of units of work; code to automatically validate the imported input financial data, where the code to validate includes at least: code to identify, in the imported input financial data, a second plurality of deficient units of work based on a third plurality of predefined rules, where each deficient unit of work is a unit of work having at least one first current data error; code to analyze, based at least in part on research information in at least one first research database, the at least one first current data error to determine at least one first current corrective action to remedy the at least one first current data error, where the research information comprises historical information about at least one first previous data error and at least one first previous corrective action that remedied the at least one first previous data error; and code to verify that the at least one first current corrective action does not result in at least one of: i) at least one additional deficient unit of work, ii) at least one additional data error, and iii) at least one change in at least one predefined data report; and code to automatically execute the at least one first current corrective action to remedy the at least one first current data error.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

FIG. 1A and FIG. 1B form FIG. 1 that illustrates a schematic flowchart in accordance with some embodiments of the present invention.

FIG. 2A, FIG. 2B, and FIG. 2C form FIG. 2 that illustrates another schematic flowchart in accordance with some embodiments of the present invention.

FIG. 4A and FIG. 4B form FIG. 4 that illustrates still yet another schematic flowchart in accordance with some embodiments of the present invention.

Figure 1A:
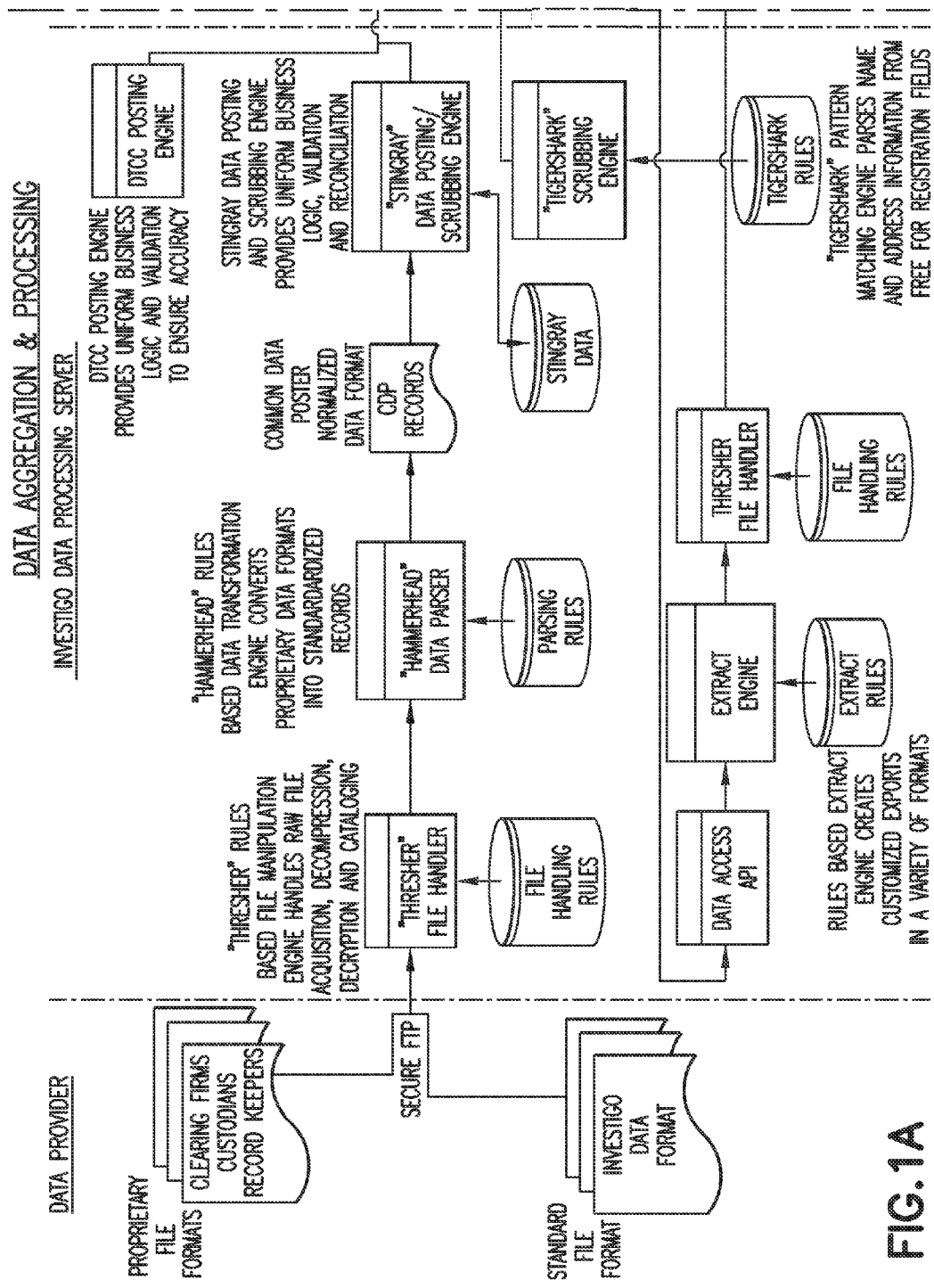

The figures constitute a part of this specification and include illustrative embodiments of the present invention and illustrate various objects and features thereof. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "In some embodiments" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In addition, as used herein, the terms "real time" means without undue delay and to be performed within a single time communication session while particular healthcare constituents transacting with or through at least some embodiments of the computer systems of the instant invention.

In some embodiments, the instant invention provides a complex data analysis and repair tool that analyzes and repairs financial data as part of data processing. In some embodiments, the data processing can be an Extract, Transform and Load (ETL) process that at least involves:

1) Extracting data from outside sources,
2) Transforming it to fit operational needs (which can include quality levels), and
3) Loading it into the end target (database or data warehouse).

In some embodiments, the instant invention uses business logic rules to recognize and repair financial data based on common irregularities found in most financial data providers. In some embodiments, the instant invention reconciles financial transactions in correlation to positions and balances received by data providers. In the event financial data does not reconcile, or has any type of data integrity error, in some embodiments, the instant invention can then verify the data integrity on individual records of data received from financial data vendors. In some embodiments, the instant invention provides a thorough validation of each record received from vendors through a rules based engine. In some embodiments, the instant invention, each record can/will have multiple checks and the results of each validation will be stored for each record. Upon failing a validation, in some embodiments, the instant invention can attempt to perform a data repair based on business logic rules. In some embodiments, the instant invention records that fail the validation and data repair are not be loaded into the client database, instead those records are held in one or more interim database for further reviewed by highly trained individuals before being released to the end user. In some embodiments, records that pass validation are loaded into the client's data warehouse.

In some embodiments, the instant invention is a part of an ETL process that processes financial data, validates repairs and loads data that has been received from various financial data providers:

Step 1: Validate the data
Step 2: Attempt to repair the data
Step 3: Load the data into the data warehouse
Step 4: Any data that failed a validation, hold in an interim database for manual and/or automatic review/repair before being released to end user.

In some embodiments, the instant invention automatically repairs data that does not pass data integrity checks, any undetected exceptions with data integrity and can prepare data for manually review.

In some embodiments, the instant invention provides a flexible, rules-based, automated data scrubbing engine. In some embodiments, the instant invention automatically identifies un-reconciled transactions and missing data elements and applies fixes based at least in part on a configurable set of business logic rules by recognizing patterns by using complex business logic housed in the data scrubbing engine.

In some embodiments, a manual data scrubbing service can be additionally performed. In some embodiments, all failed validations that cannot be automatically corrected with the automated data repair engine can be held from posting to the database until the failure is analyzed.

In some embodiments, the instant invention can be an integral part of the data processing shown in FIG. 1. For example, in some embodiments, the instant invention automatically identifies un-reconciled transactions and missing data elements and applies fixes, when possible, based on a configurable set of business logic rules housed in one or more databases associate with one or more data scrubbing engines.

In some embodiments, the instant invention provides a rules-based data scrubbing engine with aggregation capabilities. In some embodiments, the engine identifies un-reconciled positions, balance conditions, and validates specific elements of the custodial data. In some embodiments, failed validations are held from posting to the firm database until being analyzed.

Examples of Data Validation Rules

In some embodiments, the instant invention can perform at least the following types of validations:

Position Reconciliation. In some embodiments, this validation is completed prior to posting data into the client database by comparing data being received to the data currently in the client database. In the event a discrepancy is found, the account will be held until this position reconciles.

Balance Reconciliation. In some embodiments, Balance Reconciliation compares balances received to balances currently in the client database prior to posting them to the client database.

In some embodiments, the instant invention can perform rules and validations on a Unit of Work level, for example, but not limited to, on an account or security. For example, if one position in an account does not balance, the entire account will be automatically held for analysis/investigation/repair. In some embodiments, the instant invention can, in real-time, flag Position or Balance records that are out of balance as well as dynamically mark them accordingly, regarding success or failure, for each validation rule. In some embodiments, the instant invention can then perform a dynamic repair process based on recognized error(s) or error pattern(s) (e.g., a missing price on a Money Market or a particular stock).

In some embodiments, the inventive systems and methods of the instant invention can incorporate at least two sets of rules, optional and standard, which can be used to ensure proper data quality as well as provide a level of customization by the client. For example, the Optional Validation Rules can be enabled or disabled to suit the client's needs and the Standard Validation Rules are required for data validation. Table 1 provides examples of the Optional Validation Rules. Table 2 provides examples of the Standard Validation Rules.

TABLE 1

| VALIDATION RULE CODE | VALIDATION RULE DESCRIPTION | VALIDATION RULE DEFINITION |
|---|---|---|
| BalanceReconcile | Check Balance reconciles on Account | A Balance Does Not Reconcile |
| PositionReconcile | Checks position reconciliation on Account | Invalid Account Position Reconciliation |
| AccountRepAssignedToUser | Verify the RepresentativeCode is assigned to a User | Representative Code not Assigned to a User |
| AccountSignCheckMarketValue | Verify Market Value is correctly signed | Invalid Market Value |
| BalanceDateCheckEffectiveDate | Verify Effective Date is no further than 2 months out | Effective Date is Further than 2 Months Out |
| SecurityOptionSymbol | Verify Symbol is populated on option securities | Missing Symbol for Option Security |
| TransactionDateCheckTransactionEffectiveDate | Verify Transaction Effective Date is no further than 2 months out | Transaction Effective Date Further than 2 Months Out |
| TransactionRegLine1OrAddrLine1Populated | Verify that the Reg Line1 or Add Line1 is populated if the pTigershark field is enabled | Missing address line 1 |
| TransactionMoneyMarketIsPriced | Verify transactions that have an action attribute of "Reconcile" and security type of "MoneyMarket" also are priced at 1 | Money Market Transaction is Not Priced |

TABLE 2

| VALIDATION RULE CODE | VALIDATION RULE DESCRIPTION | VALIDATION RULE DEFINITION |
|---|---|---|
| AccountCustodianChange | Verify Account UOW does not have possible Custodian change | Invalid Change of Custodian |
| AccountDataTypeCheckCloseDate | Verify data type | Invalid Account Close Date |
| AccountDataTypeCheckOpenDate | Verify data type | Invalid Account Open Date |
| AccountDataTypeCheckPrimaryDOB | Verify data type | Invalid Account Primary DOB |
| AccountDataTypeCheckSecondaryDOB | Verify data type | Invalid Account Secondary DOB |
| AccountDuplicateCheck | Check for duplicate account records | Duplicate Account |
| AccountIDOnAccount | Validates Account UOW AccountID is populated | Missing Account ID |
| AccountIDOnBalance | Validates Balance UOW AccountID is populated | Missing Account ID on Balance |
| AccountIDOnCostBasis | Validates CostBasis UOW AccountID is populated | Missing Account ID |

TABLE 2-continued

| VALIDATION RULE CODE | VALIDATION RULE DESCRIPTION | VALIDATION RULE DEFINITION |
|---|---|---|
| AccountIDOnObjective | Validates Objective UOW AccountID is populated | Missing Account ID on Objective |
| AccountIDOnPosition | Validates Position UOW AccountID is populated | Missing Account ID on Position |
| AccountIDOnTransaction | Validates Transaction UOW AccountID is populated | Missing Account ID on Transaction |
| AccountNetworkLevelValid | Verify NetworkLevelID is populated if NetworkLevel is provided | Missing Network Level ID |
| AccountPrimarySSNCheck | Verify Account columns are populated if the bProcessTigershark flag is set to 1 | Invalid Primary SSN |
| AccountRepCodeValid | Verify the RepresentativeCode is assigned to a User | Representative Code not Assigned to a User |
| AccountRequiredFields | Verify required fields are populated | Missing Required Account Information |
| AccountThirdPartyMoneyManager | Verify it the Account has a third party MM that the ID is set | Missing Third Party Money Manager ID |
| AccountTypeCustodianValid | Verify AccountTypeCustodianID is populated if AccountTypeCustodian is provided | Missing Custodian ID |
| AccountTypeValid | Verify AccountTypeID is populated if AccountType is provided | Missing Account Type ID |
| BalanceCustodianChange | Verify Balance UOW does not have possible Custodian change | Invalid Change of Custodian |
| BalanceDataTypeCheck-EffectiveDate | Verify data type | Invalid Balance Effective Date |
| BalanceDuplicateCheck | Check for duplicate balance records | Duplicate Account Balance |
| BalanceRequiredFields | Verify required fields are populated | Missing Required Account Balance Information |
| BalanceTypeValid | Verify BalanceTypeID is populated if BalanceType is provided | Missing Balance Type ID |
| CostBasisDataTypeCheckClose-Amount | Verifies Field is the proper data type | Invalid Cost Basis Close Amount |
| CostBasisDataTypeCheckClose-Date | Verifies Field is the proper data type | Invalid Cost Basis Close Date |
| CostBasisDataTypeCheckClose-Price | Verifies Field is the proper data type | Invalid Cost Basis Close Price |
| CostBasisDataTypeCheckOpen-Amount | Verifies Field is the proper data type | Invalid Cost Basis Open Amount |
| CostBasisDataTypeCheckOpen-Date | Verifies Field is the proper data type | Invalid Cost Basis Open Date |
| CostBasisDataTypeCheckOpen-Price | Verifies Field is the proper data type | Invalid Cost Basis Open Price |
| CostBasisDataTypeCheckQuantity | Verifies Field is the proper data type | Invalid Cost Basis Quantity |
| CostBasisRequiredFields | Verify required fields are populated | Missing Required Cost Basis Information |
| CusipChangeTransaction | Validates Transaction UOW, fails CusipChange TranCodes | CUSP Change Detected |
| AccountColumnsCheck | Verify Account columns are populated if the bProcessTigershark flag is set to 1 | Invalid Account Information |
| AccountDataTypeCheck-MarketValue | Verify Market Value is correct type | invalid Market Value |
| BalanceColumnsPopulated | Verify Balance Columns are populated | Missing Required Balance Information |
| BalanceDataTypeCheck-CashBalance | Verify Cash Balance is correct type | Invalid Cash Balance |
| BalanceDataTypeCheck- | Verify Cash Balance Date | Invalid Cash |

TABLE 2-continued

| VALIDATION RULE CODE | VALIDATION RULE DESCRIPTION | VALIDATION RULE DEFINITION |
|---|---|---|
| CashBalanceDate | is correct type | Balance Date |
| PositionColumnsPopulated | Verify Position Columns are populated | Missing Positions |
| PositionDataTypeCheckAsOfDate | Verify AsOfDate is correct type | Invalid As of Date |
| PositionDataTypeCheckQuantity | Verify Quantity is correct type | Invalid Quantity |
| PositionDateCheckAsOfDate | Verify As Of Date is no further than 2 months out | As of Date is Further than 2 Months Out |
| TransactionAmountPopulated | Verify transactions that have an action attribute of "Balance" also have amount populated | Missing Transaction Amount |
| TransactionDataTypeCheckAmount | Verify Amount is correct type | Invalid Amount |
| TransactionDataTypeCheckEffectiveDate | Verify EffectiveDate is correct type | Invalid Effective Date |
| TransactionDataTypeCheckQuantity | Verify Quantity is correct type | Invalid Quantity |
| TransactionSignCheckQuantityNetAmount | Verify Quantity and Net Amount is correctly signed | Invalid Quantity and/or Net Amount |
| ObjectiveCustodianChange | Verify Objective UOW does not have possible Custodian change | Invalid Change of Custodian |
| ObjectiveRequiredFields | Verify required fields are populated | Missing Required Objectives Information |
| PositionCustodianChange | Verify Position UOW does not have possible Custodian change | Invalid Change of Custodian |
| PositionDataTypeCheckEffectiveDate | Verify data type | Invalid Position Effective Date |
| PositionDuplicateCheck | Validates Position U0W does not have duplicate Security ID, PositionTypeID | Duplicate Position |
| PositionRequiredFields | Verify required fields are populated | Missing Required Position Information |
| PositionTypeValid | Verify PositionTypeID is populated if PositionType is provided | Missing Position Type ID |
| SecurityDataTypeCheckCallDate | Verify data type | Invalid Security Call Date |
| SecurityDataTypeCheckDividendPayableDate | Verify data type | Invalid Security Dividend Payable Date |
| SecurityDataTypeCheckExDivDate | Verify data type | Invalid Security Ex Dividend Date |
| SecurityDataTypeCheckFactorDate | Verify data type | Invalid Security Factor Date |
| SecurityDataTypeCheckInitDate | Venfy data type | Invalid Secunty Initial Date |
| SecurityDataTypeCheckMatureDate | Verify data type | Invalid Security Mature Date |
| SecurityDataTypeCheckPreviousFactorDate | Verify data type | Invalid Security Previous Factor Date |
| SecurityDataTypeCheckPriceDate | Verify data type | Invalid Security Price Date |
| SecurityDivDivDateValid | Verify Dividend information is populated properly | Invalid Security Dividend Information |
| SecurityDivDivDateValid2 | Verify Dividend information is populated properly | Invalid Dividend Date |
| SecurityDivExDivDateValid | Verify Dividend information is populated properly | Invalid Reinvestment Date |
| SecurityDuplicateCheck | Check for duplicate security records | Duplicate Security |
| SecurityIDOnCostBasis | Validates CostBasis UOW SecurityID is populated | Security Could Not Be Set-up Properly |

TABLE 2-continued

| VALIDATION RULE CODE | VALIDATION RULE DESCRIPTION | VALIDATION RULE DEFINITION |
| --- | --- | --- |
| SecurityIDOnPosition | Validates Position UOW SecurityID is populated | Missing Security ID on Position |
| SecurityPayableFrequencyValid | Verify PayableFrequencyID is populated if PayableFrequency is provided | Missing Security Payable Frequency ID |
| SecurityRequiredFields | Verify required fields are populated | Missing Required Security Information |
| SecurityShareClassValid | Verify ShareClassID is populated if ShareClass is provided | Missing Security Share Class ID |
| SecurityTypeValid | Verify SecurityTypeID is populated if SecurityType is provided | Missing Security Type ID |
| TransactionCancellationUnmatched | Verify Trade Cancellations match existing trades in the firm | Unmatched Trade Cancellations |
| TransactionCodeValid | Verify TransactionCodeID is populated if TransactionCode is provided | Missing Transaction Code ID |
| TransactionCusipSecurityID | Verify populated CUSIPs have a SecurityID | Missing Security ID for CUSIP |
| TransactionCustodianChange | Verify Transaction UOW does not have possible Custodian change | Invalid Change of Custodian |
| TransitionDataType-CheckExecutionTime | Verify data type | Invalid Transaction Execution Time |
| TransactionDataType-CheckSettleDate | Verify data type | Invalid Transaction Settle Date |
| TransactionDataType-CheckTradeDate | Verify data type | Invalid Transaction Trade Date |
| TransactionExchangeValid | Verify ExchangeID is populated if Exchange is provided | Missing Exchange ID |
| TransactionPositionTypeValid | Verify PositionTypeID is populated if PositionType is provided | Missing Position Type ID |
| TransactionPricePopulated | Verify transactions that have an action attribute of "PriceRequired" also have price populated | Missing Price |
| TransactionQuantityPopulated | Verify transactions that have an action attribute of "Reconcile" also have quantity populated | Missing Transaction Quantity |
| TransactionRequiredFields | Verify required fields are populated | Missing Required Transaction Information |
| TransactionSolicitationValid | Verify SolicitationID is populated if Solicitation is provided | Missing Transaction Solicitation ID |
| TransactionStatusValid | Verify StatusID is populated if Status is provided | Missing Transaction Status ID |

Examples of Functions of Some Embodiments

In some embodiments, the instant invention performs data cleansing by correcting or eliminating inaccurate records from a database. In some embodiments, the instant invention allows to detect so called dirty data (e.g., incorrect, irrelevant or incomplete parts of the data) to either modify or delete it to ensure that a given set of data is accurate and consistent with other sets in the system.

In some embodiments, the instant invention performs historical data cleaning.

For example, the inventive computer system(s)/engine(s) can analyze the received data and perform typical fixes such as, but not limited to:
Modify the Position Effective Date,
Delete Zero Position records,
Delete Duplicate transactions by changing the status, and
Modify the Transaction Effective Date.

In some embodiments, when the inventive computer system/engine finds issues with the data, it can hold the records under different validation rule categories until the issues are resolved. In some embodiments, the instant invention provides for dynamic centralized gatekeeping functionality to clean data before the data received from one or more outside sources is imported into a company's internal databases and/or used by internal programs.

Figure 2A:
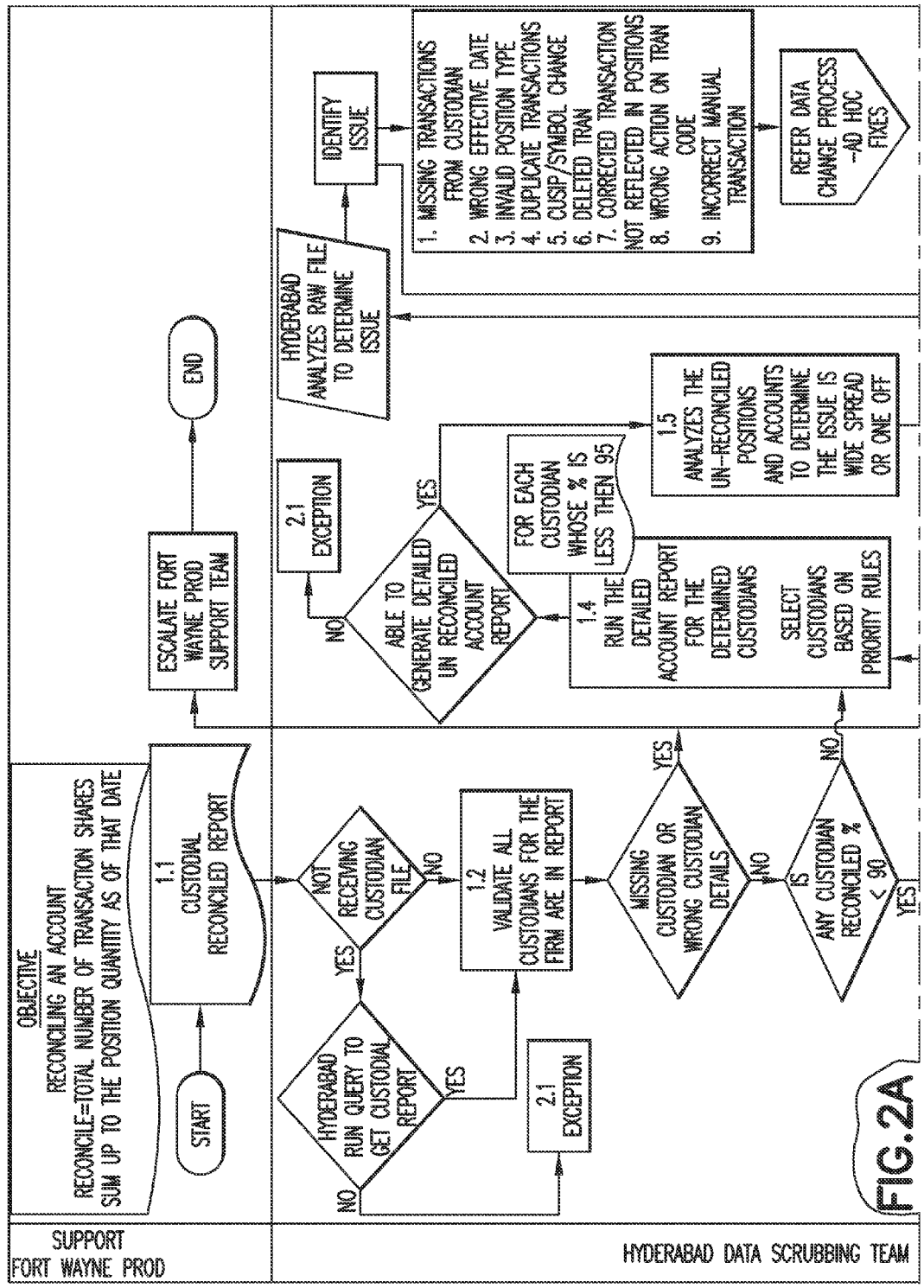
Figure 3:
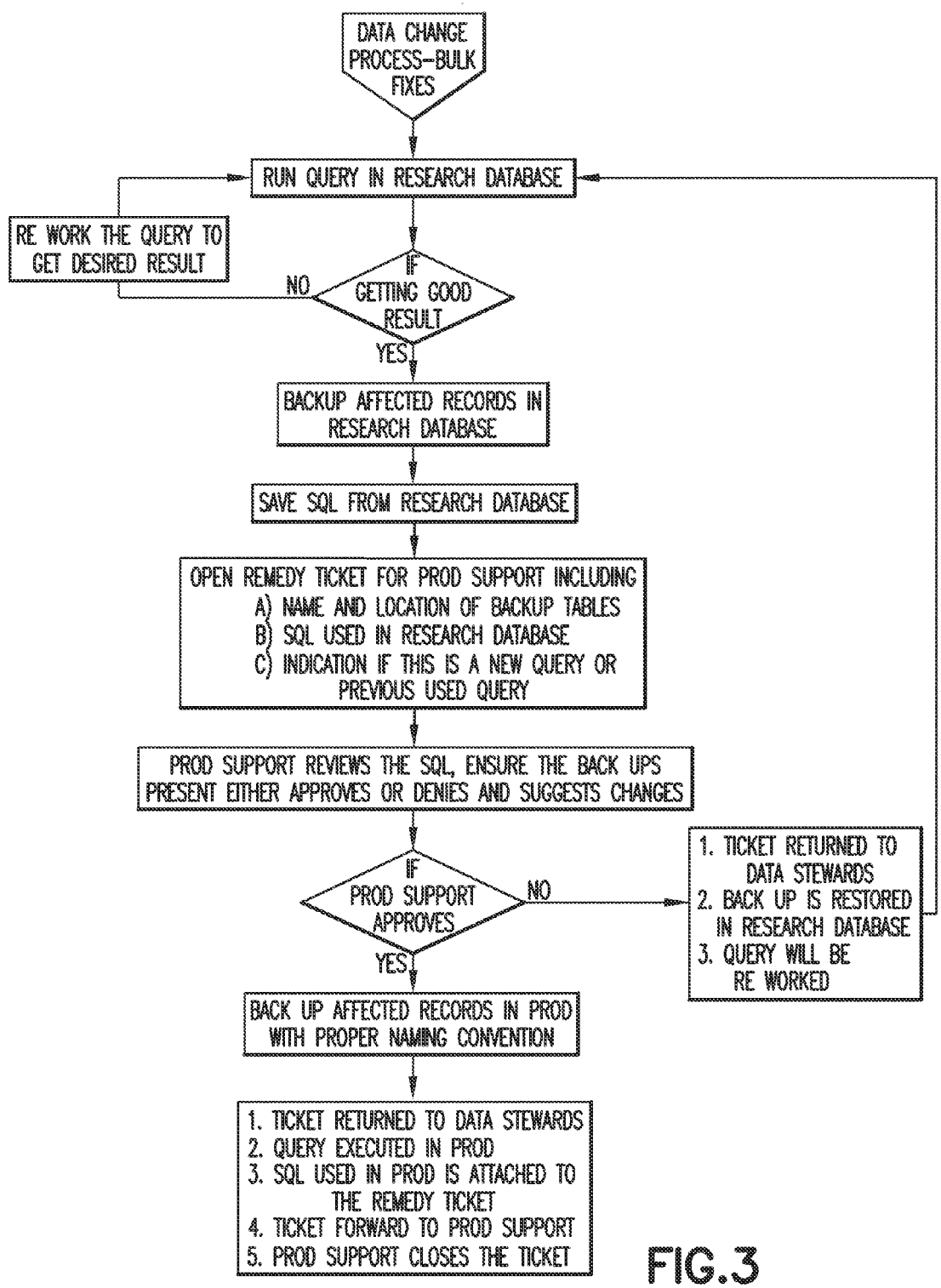
FIG. 3 illustrates yet another schematic flowchart in accordance with some embodiments of the present invention.
Figure 4A:
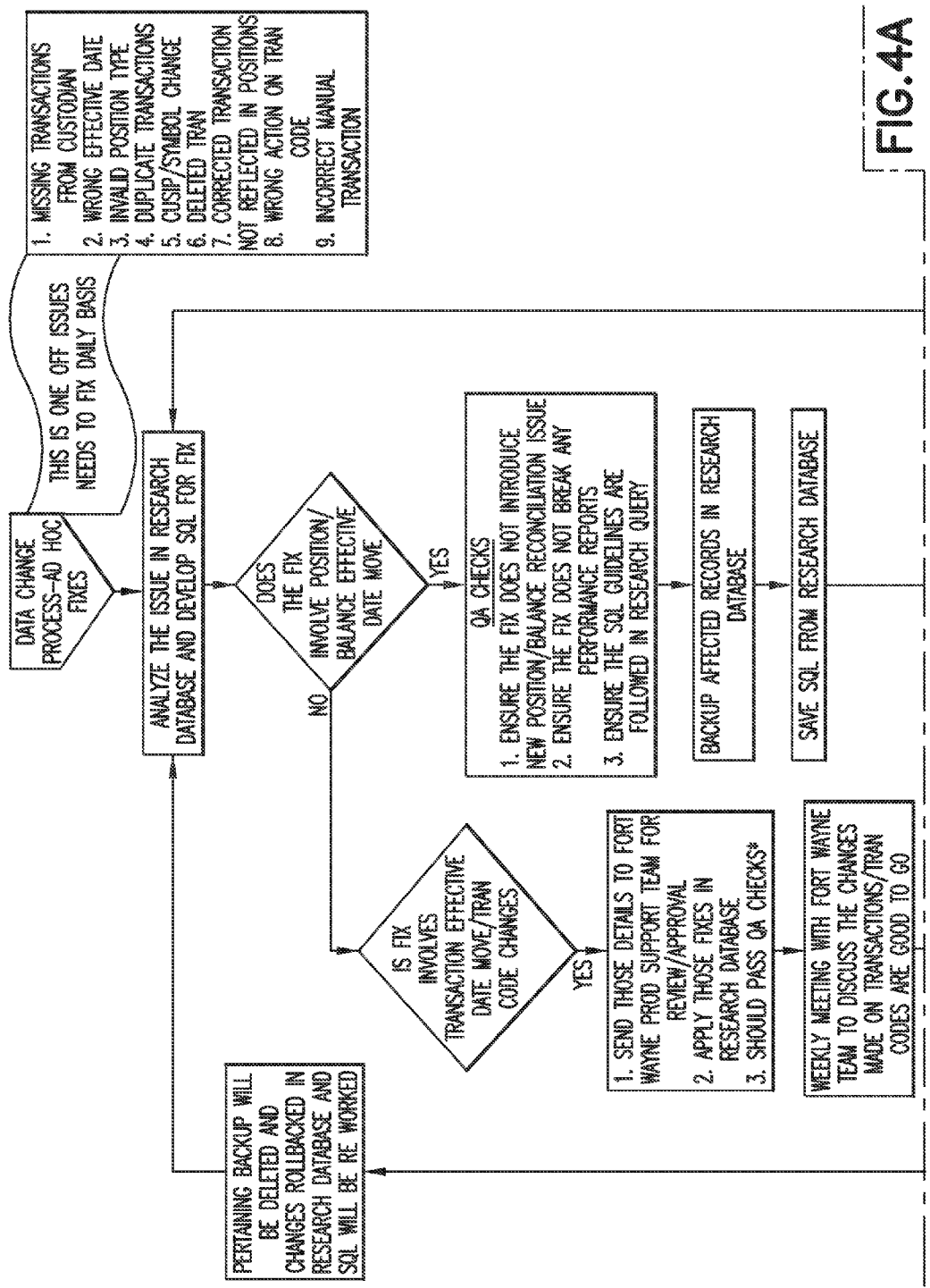

FIGS. 2-4 shows exemplary workflows in accordance with which some embodiments of the instant invention can operate. For example, in one exemplary workflow can consist of:

1. Operation of a first computer system (e.g., Hyderabad) can include running query to get custodial report, 2. If any missing file or un-posted Transaction or missing multiple transactions, escalate to a second computer system (e.g., Fort Wayne Prod Support team), and 3. Analyzes the un-reconciled positions and accounts to determine if the issue is wide spread or one off. If it is one off issue, Hyderabad analyzes raw file to determine issue.

Examples of some typical issues/errors with data are, but not limited to:
Missing Transactions from Custodian
Wrong Effective Date
Invalid Position Type
Duplicate Transactions
Cusp/Symbol Change
Deleted Transaction
Corrected Transaction not reflected in Positions
Wrong Action on Transaction Code
Incorrect Manual Transaction In some embodiments, the instant invention can, in real-time, dynamically analyzes the issue in research database(s) (feedback/learning response mechanism) and develops SQL for fix. In some embodiments, if the fix involves Position/Balance Effective date move, the instant invention can ensure the fix does not introduce new Position/Balance reconciliation issue and the fix does not break any performance report. In some embodiments, affected records and SQL fixes in research database are backed up. In some embodiments, the instant invention can have an audit log to verify that number of changes in research database(s) and backup tables should match. In some embodiments, the instant invention can validate SQL fixes to make sure that they do not introduce additional errors/imbalances in the data. For example, the instant invention can validate SQL fixes that involve Transaction Effective date move/Transaction Code changes. In some embodiments, the instant invention can implement fixes on an account level, a plurality of related accounts, or a plurality of unrelated accounts that may have a related data issue. For example, the instant invention can fix an incorrect price of stock over a plurality of accounts that belong to different custodians (e.g., brokers, banks) and/or different account owners.

Examples of Reconciliation Issues
Terminology:

In some embodiments, a Position means a Snapshot of shares in time, per Account/Security/Position Type.

In some embodiments, the term Transaction(s) means details that make up Positions/Balances, Price and amount of money used to purchase shares.

In some embodiments, the term Reconcile means a total number of Transaction shares sum up to the Position Quantity/Balance Amount as of that date.

In some embodiments, the instant invention can identify and flag position records that do not balance when validated against transactions. In some embodiments, once the records are flagged, the instant invention can, in real-time, dynamically research; investigate the failed validations to determine an individual or global solution to be applied.

Below is an example of query to get all the unreconciled positions for a particular custodian:

```
Select
DISTINCT
    A.RecID As AccountID,
    S.RecID As SecurityID,
        P.RecID As Positionid,
        P.EffectiveDate,
        P.quantity
From tblPosition P
inner join tblAccount A on A.RecID = P.AccountID
inner join tblListSource LS on LS.RecID = A.SourceID And LS.SystemCode not in
('UHA-
AUE')
inner join tblListCustodian LC on LC.RecID = A.CustodianID
inner join tblPosition_Reconcile PR on PR.PositionID = P.RecID
inner join tblSecurity S on P.SecurityID = S.RecID
    where PR.Reconcile_StatusCD in('O') and
    LC.Description=[Custodian Name]
-- Analalyze individual unreconciled positions based on AccountID/SecurityID
        DECLARE @AccountID INT
        DECLARE @SecurityID INT
        SET @AccountID =83536
    SET @SecurityID = 9377
        -- Position records
        select * from vwSupportPosition where AccountID=@AccountID and SecurityID=
@SecurityID ORDER BY EffectiveDate
        -- Transaction records
        select * from vwSupportTransaction where AccountID=@AccountID and
SecurityID=@SecurityId ORDER BY EffectiveDate
        -- fnReconcileComparePositionTransactionWindow is the Function used
to see by now much quantity the positions records are unreconciled
        -- DIFF gives us the difference and ActualDiff is the quantity expected
between the startperiod and endperiod
        Select * ,EndPosQuantity - (StartPosQuantity + TradeQuantity)as
DIFF,EndPosQuantity - StartPosQuantity as ActualDiff
        from fnReconcileComparePositionTransactionWindow
(@accountID,@SecurityID,null,null)
```

Cash Balance Reconciliation

In some embodiments, the instant invention reconcile cash balances by analyzing all the transaction codes received from data providers to determine which transaction codes affect the cash balance. In some embodiments, the instant invention can review and/or provide a list of transaction actions (tblListTransaction_Action) and flagging each action that affects balance with an attribute of "Balance". Each transaction code can be flagged with an appropriate transaction action, allowing the invention to know which transactions should be used in the following calculation:

(Previous Cash Balance)+(Sum of Net Amounts for transactions which affect balance and occurred during the previous balance and the current balance)=(Current Cash Balance)

In some embodiments, the instant invention can reconcile the cash by taking a balance window including the previous cash balance and compare to the current cash balance. By using the dates on the balance window, some embodiments can sum up the net amounts on all the transaction that occurred in that window and have been identified to effect cash balances. Then add those transactions to the first balance in the window and the result will be the amount of the current cash balance.

When a failed reconcile occurs, in some embodiments, the instant invention can hold back all the data from a particular account that failed to reconcile on that particular day, and can continue to hold the account until a resolution is found. In some embodiments, the instant invention can follow the data scrubbing workflows (FIGS. 2-4) to determine if the data is missing or not being properly accounted for. If the scrubbing cannot resolve the issue, in some embodiments, the instant invention can request or communicate with computer systems of the Clearing Firm or Custodian for a statement to reconcile the account.

Exemplary Common Reconciliation Issues

1) 'Effective Date' Change for Position/Balance a. Balances

If the balance issues can be fixed by moving the balance date forward or backward then update the effective date to fix un-reconciled balance (ensure that the fix does not cause issue with other balance.)

b. Positions

If the position issues can be fixed by moving the position effective date forward or backward then update the effective date to fix un-reconciled position (ensure that the fix does not cause issue with other Positions.)

2) Modifying Balance (Based on Transaction Cancellation Correction)

Recalculating the balances in case of issues related to cancel/correct transactions 3) Deleting Zero Positions (Zero End Pos Quantity)

For example, un-reconciled zero positions can be deleted.

4) Inserting New Initial Transactions

If Un-reconciled positions are determined to be the first Position, the invention can insert an initial transaction.

5) Modifying 'Action Code' for 'Transaction Codes'

It can provide a supervisory review.

6) Ignoring/Deleting Transactions

Delete the duplicate transactions or map the duplicate transaction Action code to 'ignore'.

7) CUSIP/Symbol Change

All Cusip/symbol change issues can result in a remedy ticket and once the solution is approved, the changes are implemented.

8) Invalid Position Type

For Invalid position type issues can result in a remedy ticket and once the solution is approved, the changes are implemented.

6.5. Mass Fixes 6.5.1. Mass Cleanup and Bulk Modifications

When a particular issue is determined to be impacting the data at large scale across accounts and/or custodians, queries are built and applied to automatically identify and fix the data.

In some embodiments, the instant invention can ensure that:

1. Only the data/fields intended for the change are modified
2. System performance is not affected
3. The Guidelines for TSQL queries as listed below to be followed.

Examples of Validation Rule Engine

In some embodiments, the instant invention can provide capabilities of running certain validation rules to segregate data problems into various predefined categories. Some fixes can be automatically put into the data. In some embodiments, the instant invention can provide capabilities to alertiflag that identify certain issues and generate output that identifies them.

Examples of Validation Rules

1) Position Validation

Position/Transaction reconcile

Will flag position records that are out of balance

Each un-reconciled position record will have one of the following flags:
   a. Open (Out of balance)
   b. Unresolvable (No known solution)

Examples:
   a. Clearing Firm A provides a position of 100 shares
   b. Sum of last position and active transactions since the last position is 40 shares
   c. Position of 100 shares will be flagged as 'Open'
   d. Data Steward obtains and adds a transaction of 60 shares from a Client or Custodian provided statement
   e. Position record status is updated to 'Cleaned'

2) Cash Balance Validation

When a failed reconcile occurs, in some embodiments, the instant invention can hold back all the data from the account that failed to reconcile on that particular day, and can continue to hold the account until a resolution is found. In some embodiments, the instant invention can follow the data scrubbing workflows (FIGS. 2-4) to determine if the data is missing or not being properly accounted for. If the scrubbing cannot resolve the issue, in some embodiments, the instant invention can request or communicate with computer systems of the Clearing Firm or Custodian for a statement to reconcile the account.

3) Data Element Validation

In some embodiments, the instant invention can validate data elements based upon business rules established by a Client. For example, the inventive engine can validate and attempt to repair any data that can be programmatically repaired. If a record failed a validation and cannot be repaired, the record will be held back for further investigation. All failed validations can be identified and logged for auditing. In some embodiments, the instant invention can provide a functionalities to dynamically examine the data feed rules to see if the issue can be fixed globally in the data feed. If the issue is isolated and a one-off, the instant invention can request or communicate with computer systems of the Clearing Firm or Custodian for a statement to reconcile the account. Once the record is repaired and re-validated, the data will be delivered to the Client via the IDM.

In some embodiments, Data Element Validations can consist of the following:

Able to audit any data

Rules based validation

Capable of running data validation rules on a given unit of work (e.g. an account or security). If a transaction is received or updated, the account will be checked again.

Data record will be marked accordingly regarding success or failure for each validation rule Records will not be passed to clients until they have successfully passed all validations Data scrubbing engine also contains a repair process Repair process will handle cases where a known data issue can be reliably and accurately corrected.

In some embodiments, the instant invention can offer an ability to customize validation rules to business requirements. In some embodiments, the customized rules can be Custodian or Security type based wherever needed.

Security Master Validation (CUSIP and Symbol Validation)

In some embodiments, the instant invention can validate for correct CUSIPS and symbols. If the symbol is the same as the CUSIP, records can be held back from being released the symbol or CUSIP is corrected by contacting the Custodian, Clearing Firm, or use available resources. In some embodiments, the instant invention can identify securities that are missing the symbol or CUSIP, and flagged those for further checking the symbol or CUSIP.

Posting Considerations Validation

In some embodiments, the instant invention can handle rules based validations related to the posting of data to an external database/computer system. In some embodiments, the inventive computer systems and methods of the instant invention can utilize validations to prevent the loading of incorrect custodial data. In some embodiments, the inventive computer systems and methods of the instant invention, depending upon the data type of external source data and/or at user's discretion, process a particular data type through the cleansing engine but not hold the data from posting to the Data Warehouse and in turn the IDM. For example, the above procedure can be useful if a particular field is required for posting while other fields are held back from posting until such time as data anomalies identified by the scrubbing engine(s) (identified as "Stingray", "Tigershark" in Figures) have been corrected.

Error Log

In some embodiments, the instant invention can provide an error log to validate data quality. In one example, the error log can consist of the account/security that failed the validation as well as the validation that failed. In another example, the log can consist of records that are currently in a fail state; once the record is repaired and revalidated the record will be removed from the error log table.

Remedy

In some embodiments, the instant invention can provide a remedy system for tracking purposes.

Issue Logging System

Each data raise is logged in the Remedy/Tracking system.

Exemplary Guidelines for Writing TSOL Queries

1. Do not leave queries running unattended.

2. Do not leave them running for more than 10 minutes unless authorized (full run of spReconcile_Positions_Calc is authorized to be run once a week on any firm, no more)

3. Do NOT restart a script that has been forcibly killed (severe error occurred/query window has been disconnected/etc.) until the script has been reviewed.

4. If you have done a BEGIN TRANSACTION, you need to make sure that you have Committed or ROLLBACK the transaction.

Note; it is possible to have more than one level of transaction open. If this is the case, you need to make sure that you have committed as many times as you began the transactions. If SELECT @@TRANCOUNT returns anything other than 0, then you still have a transaction open.

Exemplary SOL Mass cleanup queries Review process

A following list needs to be reviewed before being run:

1. OUTER/CROSS APPLY

2. WHILE/CURSOR loops (batch processing is fine if you're doing 100's to 1000's of records at a time, one at a time loops are avoided)

3. Subs-elects containing a view/more than 3 levels of sub-selects

4. Temp tables with over 1 million rows

Examples of Modifying Fields

1. Transaction Effective Dates should be changed only after a confirmation or if it is a known issue.

2. Action Codes for Tran Codes should not be modified and a remedy should be raised when needed.

3. Position Effective Date can be automatically modified within a certain predetermine range of days.

Testing

Reconciliation Check

In some embodiments, the instant invention can ensure that the fix applied corrects the issue in totality and does not give a partial solution. In some embodiments, the check can be done in two ways based on where the fix is applied Firm fix: Once the fix is applied in the firm, the check should be simple enough to see if the position/balance which was not reconciled before is fixed.

Conditional fix: The records in error are marked with a particular identifier (e.g., statusid 3) and once the solution is found and applied, the statusid should change to 2 and the corresponding records should be released into destination database. In some embodiments, the records (fixed records and/or records that were previously identified as compliant) may need to be reprocessed for the records to be released.

Impact on Reports

In some embodiments, the instant invention can provide reports regarding, but not limited to, errors identified and/or fixes. In some embodiments, the instant invention can, in real-time, dynamically check for the accuracy of the fix with some scripts to see if they have a positive/negative impact on the reports. In some embodiments, it is not necessary that a fix that breaks a report is always a bad fix because it could be a change that might have to be incorporated in the reports.

Table 3 shows examples of database objects that can be utilized in some embodiments of the instant invention.

TABLE 3

| Database Object | Detail |
| --- | --- |
| tblListCustodian | Static table for Custodians |
| tblListSource | Static table for Data sources |
| tblListThirdParty-MoneyManager | Static table for TAMP data |
| tblListBalanceType | Static table for Balance types |
| tblListPosition_Type | Static table for Position types |
| tblPosition | Table holding all the position records |
| tblBalance | Table holding all the balance records |
| tblTransaction | Table holding all the transaction records |
| tblAccount | Table holding all the account level details. |
| tblSecurity | Table holding all the security level details. |
| tblPosition_Reconcile | Table which holds the reconcile status of the position records |
| tblBalance_Reconcile | Table which holds the reconcile status of the balance records |
| tblPosition_Calc | holds all the unreconciled position details. |
| vwsupportPosition | View for Position table with extra details for the purpose of analysis |
| vwsupportBalance | View for Balance table with extra details for the purpose of analysis |
| vwsupportTransaction | View for transaction table with extra details for the purpose of analysis |
| fnReconcileCompare-PositionTransactionWindow | Function used to analyze Position/Balance reconciliation |

Table 4 shows examples of validation engine objects that can be utilized in some embodiments of the instant invention.

TABLE 4

| Validation Engine Object | Detail |
| --- | --- |
| vwUnitOfWorkAccount-Failures | View giving details pertaining to validation rule |
| vwUnitOfWorkAccount-FailuresDetail | View giving the exact record id in addition to the details already given by the above view pertaining to validation rule |
| tblImport_[Firm]_Account | Account data in Validation Engine/database |
| tblImport_[Firm]_Security | Security data in Validation Engine/database |
| tblImport_[Firm]_Position | Position data in Validation Enaine/database |
| tblImport_[Firm]_Balance | Balance data in Validation Engine/database |
| tblImport_[Firm]_Transaction | Transaction data in Validation Engine/database |

Figure 7:
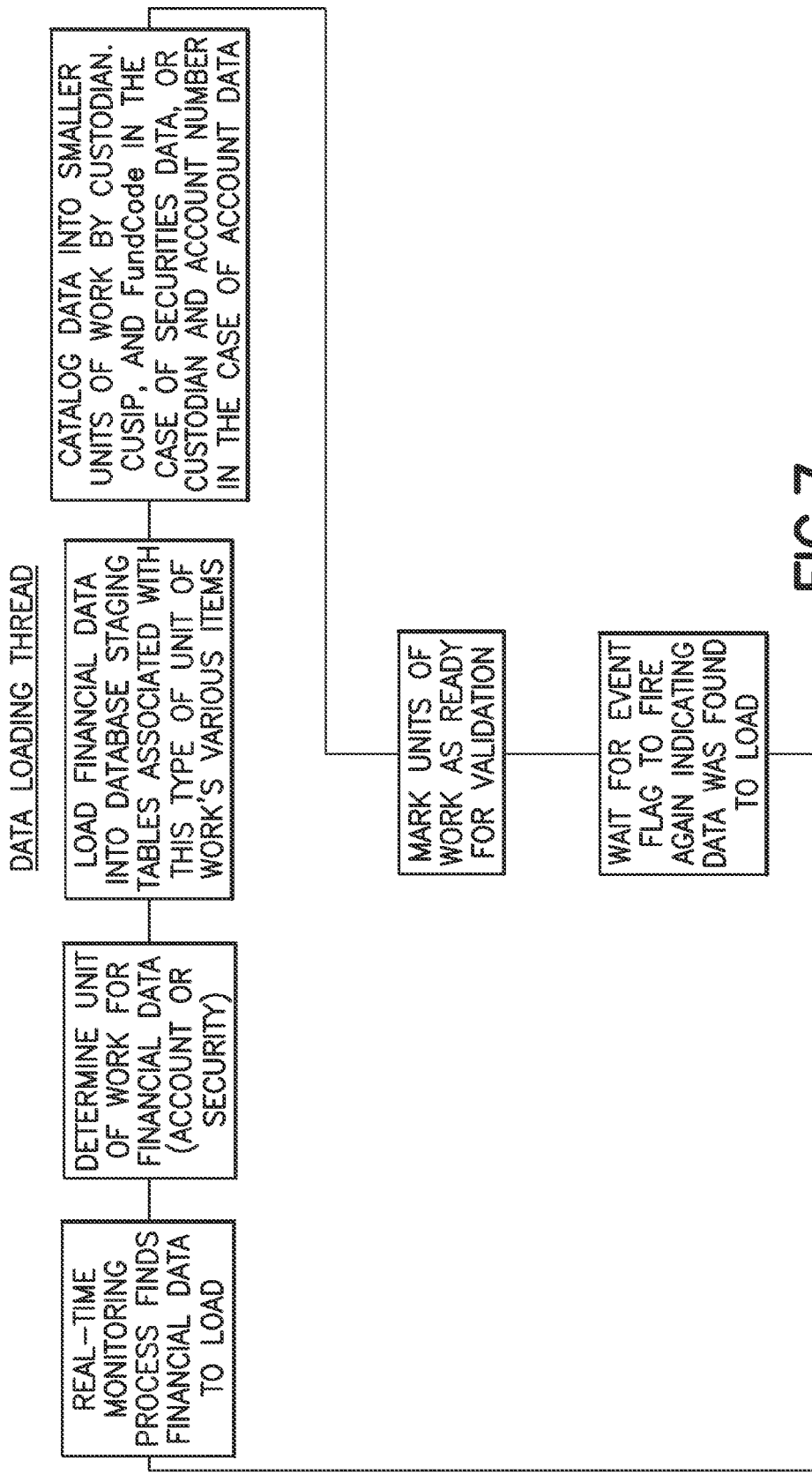
FIG. 7 illustrates yet another schematic flowchart in accordance with some embodiments of the present invention.
Figure 8:
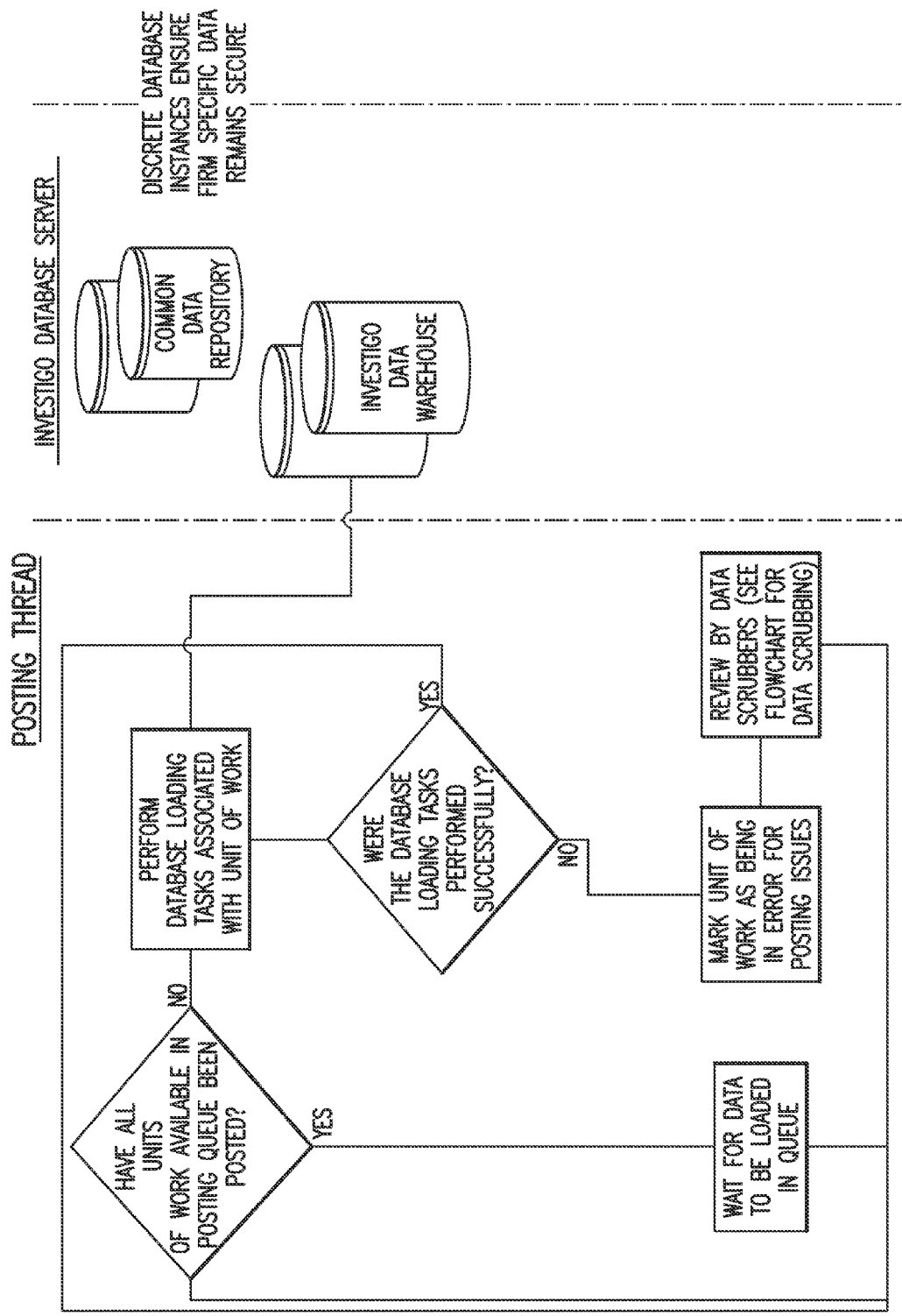
FIG. 8 illustrates still another schematic flowchart in accordance with some embodiments of the present invention.
Figure 9:
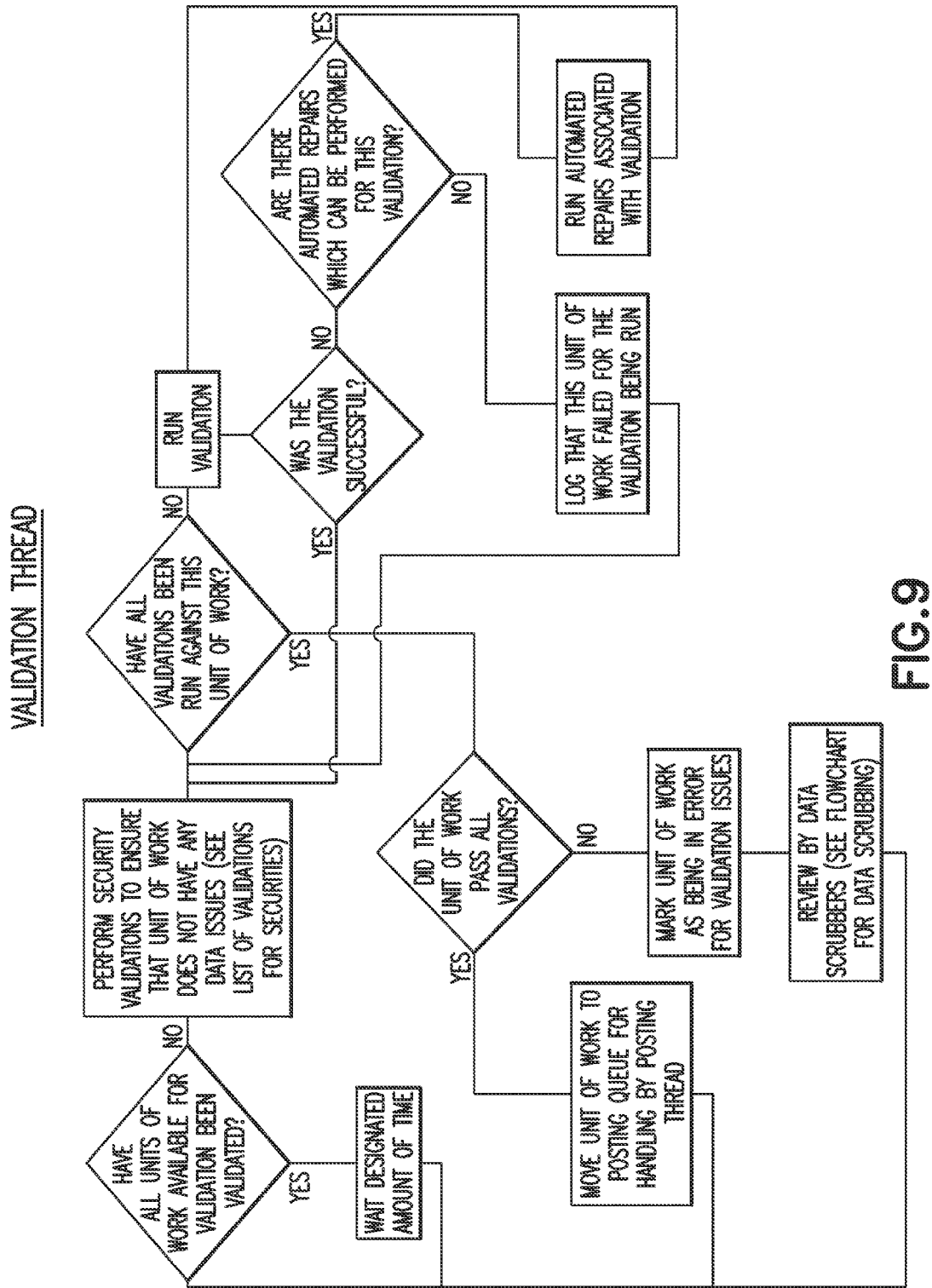
FIG. 9 illustrates yet another schematic flowchart in accordance with some embodiments of the present invention.

FIGS. 7-9 show exemplary workflows for some embodiments of the instant invention as described herein.

In some embodiments, the inventive systems and methods of the instant invention can be utilized in conjunction with processes and/or data formats described in U.S. Pat. No. 7,653,564; U.S. Pat. No. 7,689,489; U.S. Patent Pub. No. 20080040610; U.S. Patent Pub. No. 20090006267; whose specific disclosures of data processing and/or data formats are hereby incorporated herein by reference for all purposes associated with such data processing and/or data formats.

Illustrative Operating Environments of Some Embodiments of the Instant Invention.

Figure 5:
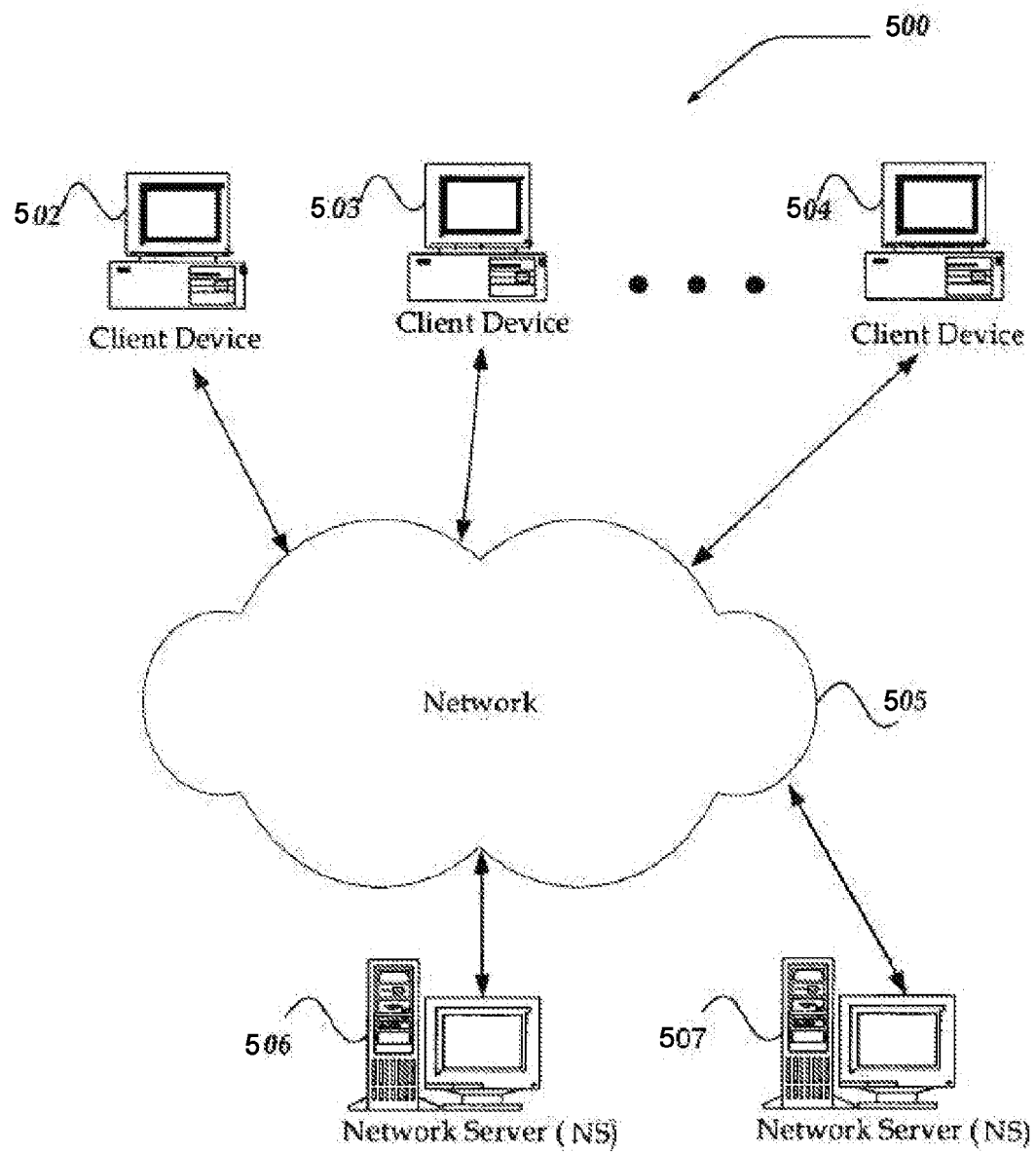
FIG. 5 illustrates a computer system in accordance with some embodiments of the present invention.

FIG. 5 illustrates one embodiment of an environment in which the present invention can operate. However, not all of these components may be required to practice the invention, and variations in the arrangement and type of the components may be made without departing from the spirit or scope of the invention. In some embodiment, the system hosts a large number of members and concurrent transactions. In other embodiments, the system is based on a scalable computer and network architecture that incorporates varied strategies for assessing the data, caching, searching, and database connection pooling. An example of the scalable architecture is an architecture that is capable of operating multiple servers.

In some embodiments, client devices 502-504 include virtually any computing device capable of receiving and sending a message over a network, such as network 505, to and from another computing device, such as servers 506 and 507, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in some embodiments, client devices 502-504 are any mobile device that is capable of connecting using a wired or wireless communication medium such as a PDA, POCKET PC, wearable electronic device (such as cellular phone, smart phone, or other equivalent mobile devices), and any other device that is equipped to communicate over a wired and/or wireless communication medium.

In some embodiments, each client device within client devices 502-504 includes a browser application that is configured to receive and to send web pages, and the like. In embodiments, the browser application is configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript. JavaScript, and the like. In embodiments, computer systems of the instant invention is programmed in either Java or .Net.

In embodiments, client devices 502-504 are further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 505 is configured to couple one computing device to another computing device to enable them to communicate. In embodiments, network 105 is enabled to employ any form of computer readable media for communicating information from one electronic device to another. Also, in embodiments, network 505 includes a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router acts as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in embodiments, remote computers and other related electronic devices could be remotely connected to either LANs or WANs via a modem and temporary telephone link. In essence, in embodiments, network 505 includes any communication method by which information may travel between client devices 502-504, and servers 506 and 507.

In some embodiments, clients can query databases utilizing SQL (Structured Query Language) or Transact-SQL (T-SQL), programming languages designed for managing data in database management systems. In some embodiments, T-SQL can include procedural programming, local variables, various support functions for string processing, date processing, mathematics, etc. and changes to the DELETE and UPDATE statements.

Figure 6:
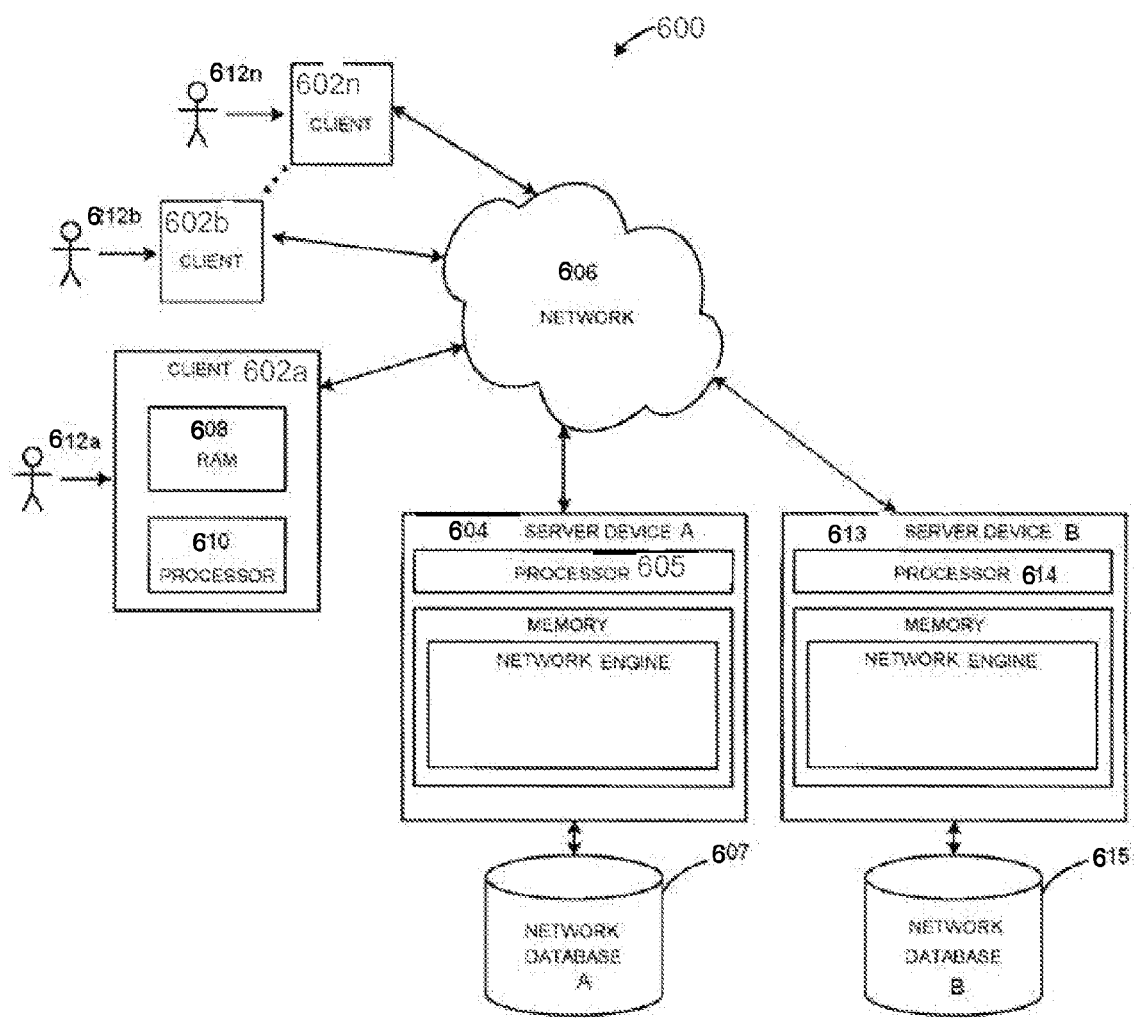
FIG. 6 illustrates another computer system in accordance with some other embodiments of the present invention.

FIG. 6 shows another exemplary embodiment of the computer and network architecture that can support the disclosed systems and methods of the instant invention. The client devices 602a, 602b thru 602n shown each comprises a computer-readable medium, such as a random access memory (RAM) 608 coupled to a processor 610. The processor 610 executes computer-executable program instructions stored in memory 608. Such processors comprise a microprocessor, an ASIC, and state machines. Such processors comprise, or are in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 610 of client 602a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media transmit or carry instructions to a computer, including a router, private or public network, or other transmission device or channel, both wired and wireless. The instructions comprise code from any computer-programming language, including, for example, C, C++, C#, Visual Basic, Java, Python, Perl, and JavaScript.

Client devices 602a-n also comprise a number of external or internal devices such as a mouse, a CD-ROM, DVD, a keyboard, a display, or other input or output devices. Examples of client devices 602a-n are personal computers, digital assistants, personal digital assistants, cellular phones, mobile phones, smart phones, pagers, digital tablets, laptop computers, Internet appliances, and other processor-based devices. In general, a client device 602a are any type of processor-based platform that is connected to a network 206 and that interacts with one or more application programs. Client devices 602a-n operate on any operating system capable of supporting a browser or browser-enabled application, such as Microsoft™, Windows™, or Linux. The client devices 202a-n shown include, for example, personal computers executing a browser application program such as Microsoft Corporation's Internet Explorer™, Apple Computer, Inc.'s Safari™, Mozilla Firefox, Google Chrome, and/or Opera.

Through the client devices 602a-n participants 612a-n communicate over the network 606 with the system. As shown in FIG. 6, server devices 604 and 613 are also coupled to the network 606.

For the purposes of this disclosure, a computer readable medium is a medium that stores computer data/instructions in machine readable form. By way of example, and not limitation, a computer readable medium can comprise computer storage media as well as communication media, methods or signals. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology: CD-ROM, DVD, or other optical storage; cassettes, tape, disk, or other magnetic storage devices; or any other medium which can be used to tangibly store the desired information and which can be accessed by the computer.

Further, the present invention may, of course, be implemented using any appropriate computer readable medium, computer system(s), computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

In some embodiments, the instant invention includes a computer-implemented method that includes at least: specifically programming at least one computer system to perform at least the following: automatically obtaining input financial data from at least one source; automatically determining a first plurality of units of work that the input financial data can be organized into; automatically importing the input financial data into at least one database based, at least in part, on the first plurality of units of work; automatically validating the imported input financial data, where the validating includes at least: identifying, in the imported input financial data, a second plurality of deficient units of work based on a third plurality of predefined rules, where each deficient unit of work is a unit of work having at least one first current data error, analyzing, based at least in part on research information in at least one first research database, the at least one first current data error to determine at least one first current corrective action to remedy the at least one first current data error, where the research information comprises historical information about at least one first previous data error and at least one first previous corrective action that remedied the at least one first previous data error, and verifying that the at least one first current corrective action does not result in at least one of: i) at least one additional deficient unit of work, ii) at least one additional data error, and iii) at least one change in at least one predefined data report; and automatically executing the at least one first current corrective action to remedy the at least one first current data error.

In some embodiments, each unit of work from the first plurality of units of work represents an account or a financial asset.

In some embodiments, the step of the automatically validating the imported input financial data can include segregating each deficient unit of work from the second plurality of deficient units of work into predefined categories.

In some embodiments, the third plurality of predefined rules can include: i) at least one first standard rule that is a required rule, and/or ii) at least one optional rule.

In some embodiments, the third plurality of predefined rules includes rules associated with at least one of: i)

position validation, ii) cash balance validation, iii) data element validation, iv) security validation, and v) posting considerations validation.

In some embodiments, the at least one first current data error is personal to a particular unit of work.

In some embodiments, the at least one first current data error is associated with the common among the second plurality of deficient units of work.

In some embodiments, the step of the automatically validating the imported input financial data can further include: withholding from posting each deficient unit of work for which a corrective action has not been determined.

In some embodiments, the step of the automatically validating the imported input financial data can further include: automatically marking each deficient unit of work when posting the imported input financial data so as to visually identify each deficient unit of work.

In some embodiments, the step of the automatically marking can further include: visually identifying each deficient unit of work based at least in part on one of: i) at least one first type of data error, and ii) at least one first pattern of data errors.

In some embodiments, the instant invention includes a computer system that includes at least the following components: a non-transient memory having at least one region for storing computer executable program code; and at least one processor for executing the program code stored in the memory, where the program code includes at least: code to automatically obtain input financial data from at least one source; code to automatically determine a first plurality of units of work that the input financial data can be organized into; code to automatically import the input financial data into at least one database based, at least in part, on the first plurality of units of work; code to automatically validate the imported input financial data, where the code to validate includes at least: code to identify, in the imported input financial data, a second plurality of deficient units of work based on a third plurality of predefined rules, where each deficient unit of work is a unit of work having at least one first current data error; code to analyze, based at least in part on research information in at least one first research database, the at least one first current data error to determine at least one first current corrective action to remedy the at least one first current data error, where the research information comprises historical information about at least one first previous data error and at least one first previous corrective action that remedied the at least one first previous data error; and code to verify that the at least one first current corrective action does not result in at least one of: i) at least one additional deficient unit of work, ii) at least one additional data error, and iii) at least one change in at least one predefined data report; and code to automatically execute the at least one first current corrective action to remedy the at least one first current data error.

While a number of embodiments of the present invention have been described, it is understood that these embodiments are illustrative only, and not restrictive, and that many modifications may become apparent to those of ordinary skill in the art. Further, any steps described herein may be carried out in any desired order (and any steps may be added and/or deleted).

What is claimed is:

1. A computer-implemented method, comprising:
   automatically obtaining, by at least one specifically programmed computer processor, via a computer network, input financial data from at least one electronic source, wherein the input financial data is related to a plurality of financial transactions regarding stocks, a plurality of stock-holding accounts, or both;
   automatically determining, by the at least one specifically programmed computer processor, a first unit of work to be utilized to electronically import the input financial data, wherein the first unit of work is a stock-based unit of work or an account-based unit of work;
   wherein the stock-based unit of work identifies that a first type of database objects to be utilized to hold the input financial data;
   wherein the account-based unit of work identifies that a second type of database objects to be utilized to hold the input financial data;
   wherein the first type of database objects are distinct from the second type of database objects;
   automatically importing, by the at least one specifically programmed computer processor, the input financial data into the first type of database objects or the second type of database objects based on the first unit of work to form imported input financial data;
   automatically subdividing, by the at least one specifically programmed computer processor, the imported input financial data into a plurality of second units of work based, at least in part, on:
   i) when the first unit of work is the stock-based unit of work, a custodian, a stock identifier, and a mutual fund code identifier, or
   ii) when the first unit of work is the account-based unit of work, the custodian and an account number;
   wherein each second unit of work comprises a plurality of database records having plurality of data fields;
   automatically validating, in real-time, by the at least one specifically programmed computer processor, the plurality of second units of work via at least one programmed validation engine object to form a plurality of validated second units of work;
   wherein the at least one programmed validation engine object comprises a plurality of predefined rules, comprising:
   i) at least one first predefined rule selected from stock position reconciliation validation rules,
   ii) at least one second predefined rule selected from custodian cash balance reconciliation validation rules,
   iii) at least one third predefined rule selected from data element validation rules,
   iv) at least one fourth predefined rule selected from stock identifying information validation type rules, and
   v) at least one fifth predefined rule selected from custodian posting consideration validation rules;
   wherein the automatically validating comprises:
   analyzing each filed of each database record of each second unit of work;
   identifying a plurality of deficient second units of work, wherein a particular deficient second unit of work has at least one first current data error in at least one first data field, designated as at least one first deficient data field, in at least one first database record;
   analyzing, based at least in part on research information in at least one first research database, the at least one first current data error to determine a presence of at least one first current corrective action to remedy the at least one first current data error or an absence of the at least one first current corrective action, wherein the research information comprises historical information about at least one first previous data error and at least one first previous corrective action that remedied the at least one first previous data error;
 1) when the at least one first current corrective action is present:
  verifying that the at least one first current corrective action does not result in one of:
   i) at least one additional deficient unit of work,
   ii) at least one additional data error, and
   iii) at least one change in at least one predefined data report; and
  automatically executing, the at least one first current corrective action to remedy the at least one first current data error in the at least one deficient data field of the at least one first database record to form a particular validated second unit of work from the particular deficient second unit of work; and
 2) when the at least one first current corrective action is absent:
  selectively withhold the at least one first deficient data field from the at least one first database record to form the particular validated second unit of work from the particular deficient second unit of work; and
causing, by the at least one specifically programmed computer processor, via the computer network, to post the plurality of validated second units of work to at least one data storage object of the at least one electronic source.

2. The computer-implemented method of claim 1, wherein the at least one first current data error is personal to a particular unit of work.

3. The computer-implemented method of claim 1, wherein the at least one first current data error is common among the plurality of deficient second units of work.

4. The computer-implemented method of claim 1, wherein the automatically validating the plurality of second units of work further comprises:
automatically marking each deficient second unit of work so as to visually identify each deficient second unit of work.

5. The computer-implemented method of claim 4, wherein the automatically marking comprises:
visually identifying each deficient second unit of work based at least in part on one of:
 i) at least one first type of data error, and
 ii) at least one first pattern of data errors.

6. A computer system, comprising:
a non-transient memory having at least one region for storing computer executable program code; and
at least one processor for executing the executable program code stored in the non-transient memory, wherein the executable program code comprising:
code to automatically obtain, via a computer network, input financial data from at least one electronic source, wherein the input financial data is related to a plurality of financial transactions regarding stocks, a plurality of stock-holding accounts, or both;
code to automatically determine a first unit of work to be utilized to electronically import the input financial data, wherein the first unit of work is one of: an account and a stock-based unit of work or an account-based unit of work;
wherein the stock-based unit of work identifies that a first type of database objects to be utilized to hold the input financial data;
wherein the account-based unit of work identifies that a second type of database objects to be utilized to hold the input financial data;
wherein the first type of database objects are distinct from the second type of database objects;
code to automatically import the input financial data into the first type of database objects or the second type of database objects based on the first unit of work to form imported input financial data;
code to automatically subdivide the imported input financial data into a plurality of second units of work based, at least in part, on:
 i) when the first unit of work is the stock-based unit of work, a custodian, a stock identifier, and a mutual fund code identifier, or
 ii) when the first unit of work is the account-based unit of work, the custodian and an account number;
wherein each second unit of work comprises a plurality of database records having plurality of data fields;
code to automatically validate, in real-time, the plurality of second units of work via at least one programmed validation engine object to form a plurality of validated second units of work;
wherein the at least one programmed validation engine object comprises a plurality of predefined rules, comprising:
 i) at least one first predefined rule selected from stock position reconciliation validation rules,
 ii) at least one second predefined rule selected from custodian cash balance reconciliation validation rules,
 iii) at least one third predefined rule selected from data element validation rules,
 iv) at least one fourth predefined rule selected from stock identifying information validation type rules, and
 v) at least one fifth predefined rule selected from custodian posting consideration validation rules;
wherein the code to validate comprises:
 code to analyze each filed of each database record of each second unit of work;
 code to identify a plurality of second units of work, wherein a particular deficient second unit of work has at least one first current data error in at least one first data field, designated as at least one first deficient data field, in at least one first database record;
 code to analyze, based at least in part on research information in at least one first research database, the at least one first current data error to determine a presence of at least one first current corrective action to remedy the at least one first current data error or an absence of the at least one first current corrective action, wherein the research information comprises historical information about at least one first previous data error and at least one first previous corrective action that remedied the at least one first previous data error;
 1) when the at least one first current corrective action is present:
  code to verify that the at least one first current corrective action does not result in one of:
   i) at least one additional deficient unit of work,
   ii) at least one additional data error, and iii) at least one change in at least one predefined data report; and code to automatically execute the at least one first current corrective action to remedy the at least one first current data error in the at least one deficient data field of the at least one first database record to form a particular validated second unit of work from the particular deficient second unit of work; and 2) when the at least one first current corrective action is absent:

code to selectively withhold the at least one first deficient data field from the at least one first database record to form the particular validated second unit of work from the particular deficient second unit of work; and code to cause, via the computer network, to post the plurality of validated second units of work to at least one data storage object of the at least one electronic source.

7. The computer system of claim 6, wherein the at least one first current data error is personal to a particular unit of work.

8. The computer system of claim 6, wherein the at least one first current data error is common among the plurality of deficient second units of work.

9. The computer system of claim 6, wherein the code to automatically validate the plurality of second units of work further comprises:

code to automatically mark each deficient second unit of work so as to visually identify each deficient second unit of work.

10. The computer system of claim 9, wherein the code to automatically mark comprises:

code to visually identify each deficient second unit of work based at least in part on one of:
  i) at least one first type of data error, and
  ii) at least one first pattern of data errors.

* * * * *